(12) United States Patent
Greenberg et al.

(10) Patent No.: US 11,301,987 B2
(45) Date of Patent: Apr. 12, 2022

(54) DETERMINING LOCATIONS OF SUSPECTED DEFECTS

(71) Applicant: Applied Materials Israel Ltd., Rehovot (IL)

(72) Inventors: Ofir Greenberg, Haniel (IL); Dan Segal, Rehovot (IL); Dae Hwan Youn, Rehovot (IL); Tal Ben-Shlomo, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 234 days.

(21) Appl. No.: 16/808,111

(22) Filed: Mar. 3, 2020

(65) Prior Publication Data

US 2021/0279848 A1 Sep. 9, 2021

(51) Int. Cl.
*G06T 7/00* (2017.01)
*G06T 7/77* (2017.01)

(52) U.S. Cl.
CPC .............. *G06T 7/001* (2013.01); *G06T 7/77* (2017.01); *G06T 2207/20076* (2013.01); *G06T 2207/30148* (2013.01)

(58) Field of Classification Search
CPC . G06T 2207/30148; G06T 2207/20076; G06T 7/77; G06T 7/11; G06T 7/97
See application file for complete search history.

(56) References Cited

U.S. PATENT DOCUMENTS

| | | | |
|---|---|---|---|
| 2017/0018403 A1* | 1/2017 | Koronel | H01J 37/265 |
| 2018/0218492 A1* | 8/2018 | Zhang | G06K 9/4604 |
| 2020/0020092 A1* | 1/2020 | Fang | G06T 7/001 |
| 2020/0027693 A1* | 1/2020 | Fang | H01L 21/682 |

* cited by examiner

*Primary Examiner* — Margaret G Mastrodonato
(74) *Attorney, Agent, or Firm* — Kilpatrick Townsend & Stockton LLP (57) ABSTRACT

A method, a non-transitory computer readable medium and a detection system for determining locations of suspected defects of a substrate.

13 Claims, 6 Drawing Sheets

$$\begin{bmatrix} X_{C_1} & Y_{C_1} & 0 \\ X_{C_2} & Y_{C_2} & 0 \\ \vdots & \vdots & \vdots \\ \vdots & \vdots & \vdots \\ X_{C_{Np}} & Y_{C_{Np}} & 1 \end{bmatrix} = \begin{bmatrix} A0 & A1 & A2 \\ B0 & B1 & B2 \\ 0 & 0 & 1 \end{bmatrix} * \begin{bmatrix} X_{O_1} & Y_{O_1} & 0 \\ X_{O_2} & Y_{O_2} & 0 \\ \vdots & \vdots & \vdots \\ \vdots & \vdots & \vdots \\ X_{O_{Np}} & Y_{O_{Np}} & 1 \end{bmatrix}$$

DETERMINING LOCATIONS OF SUSPECTED DEFECTS

BACKGROUND

A wafer such as a semiconductor wafer undergoes multiple mechanical and chemical processes that may result in various types of defects.

Wafer inspection and review is executed is two phases. During a first phase, an optical wafer inspection system finds suspected defects and generates location information regarding the location of the suspected defects.

During a second phase, a charged particle review system (such as a scanning electron microscope) reviews the suspected defects and determines which suspected defects are actual defects.

The optical wafer inspection system is much faster than the charged particle review system—and can scan the entire wafer in a relative short period. The resolution of the charged particle review system is much finer than the resolution of the optical wafer inspection system—and can review nanometric scale defects. Accordingly—the two phase wafer inspection and review provides a tradeoff between speed and accuracy.

The optical wafer inspection system and the charged particle review system differ from each other—and a wafer inspected by the optical wafer inspection system is mechanically moved to the charged particle review system.

Due to various reasons, the charged particle review system cannot assume that the suspected defects are located exactly at the locations indicated in the location information of the suspected defects—as measured by the optical wafer inspection system. The various reasons may include inaccuracy in location measurements of the charged particle review system, inaccuracies in navigation of the charged particle review system, and misalignment between the charged particle review system and the optical wafer inspection system.

Accordingly—the charged particle review system has to search for the suspected defects within relatively large search windows that are centered around the locations of the suspected defects.

The search process is time consuming.

There is a growing need to provide a more accurate search process.

SUMMARY

There may be provided a method, a non-transitory computer readable medium and a system for determining locations of suspected defects.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure.

Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that may be executed by the system and should be applied mutatis mutandis to a computer readable medium that is non-transitory and stores instructions executable by the system.

Any reference in the specification to a computer readable medium that is non-transitory should be applied mutatis mutandis to a method that may be applied when executing instructions stored in the computer readable medium and should be applied mutatis mutandis to a system configured to execute the instructions stored in the computer readable medium.

The term "and/or" means additionally or alternatively.

The terms "including", "having", "consisting" and "consisting essentially of" are used in an interchangeable manner. Any reference to one of the terms is applicable mutatis mutandis to any other one the terms.

The term "configured" may mean "constructed and arranged", and/or programmed.

The following terms are used in the specification:

Optical wafer inspection system (OWIS)—a wafer inspection system that uses light to detect defects. The OWIS may illuminate a wafer with visible light radiation, ultraviolet radiation, deep ultraviolet radiation and extreme ultra violet radiation. Non-limiting examples of an OWIS include the UVision™ family manufactured by Applied Materials Inc. of California, US.

OWIS determined locations of suspected defects—locations (for example coordinates) of suspected defects as measured by an OWIS.

Charged particle review system (CPRS)—a charged particle review system that uses charged particles radiation to review defects. The CPRS may illuminate suspected defects and their vicinity with electron beams or ion beams. Non-limiting examples of an CPRS include the SEM-Vision™ family manufactured by Applied Materials Inc. of California, US.

CPRS determined locations of suspected defects—locations (for example coordinates) of suspected defects as measured by an CPRS.

Permutation related mapping—a mapping between (a) OWIS determined locations of suspected defects that belong to a subgroup of suspected defects that form the permutation, and (b) CPRS determined locations of the suspected defects that belong to the subgroup.

Figure 1:
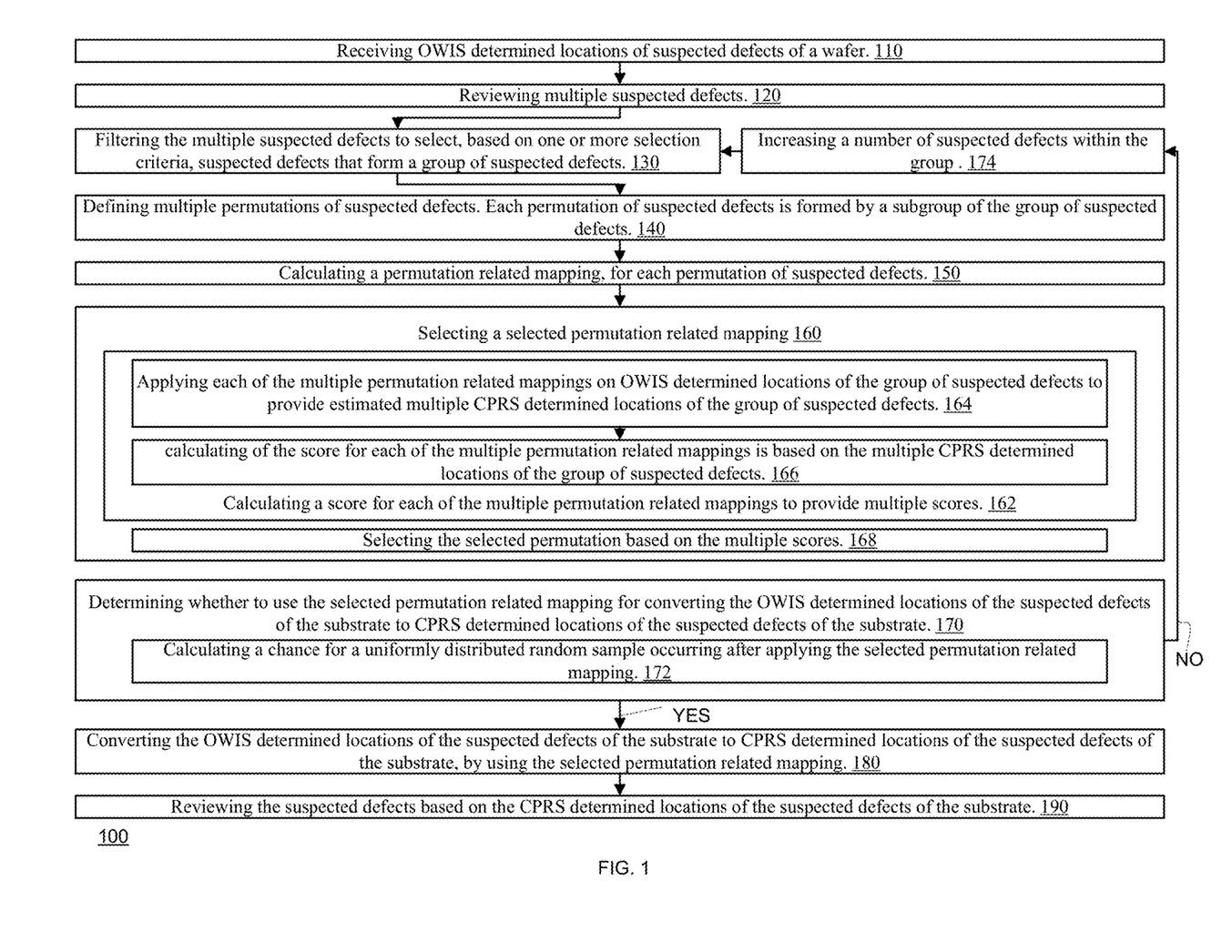
FIG. 1 illustrates an example of a method.

FIG. 1 illustrates an example of a method 100.

Method 100 may start by step 110 of receiving OWIS determined locations of suspected defects of a wafer. The OWIS determined locations of suspected defects of the wafer may be received by the CPRS.

The OWIS determined locations of the suspected defects of the wafer may provided in different formats—for example by a map of suspected defects.

The suspected defects may be spread all over the wafer—or only in some parts of the wafer.

Step 110 may be followed by step 120 of reviewing multiple suspected defects.

The multiple suspected defects may be located within one or more regions of the wafer.

Figure 2:
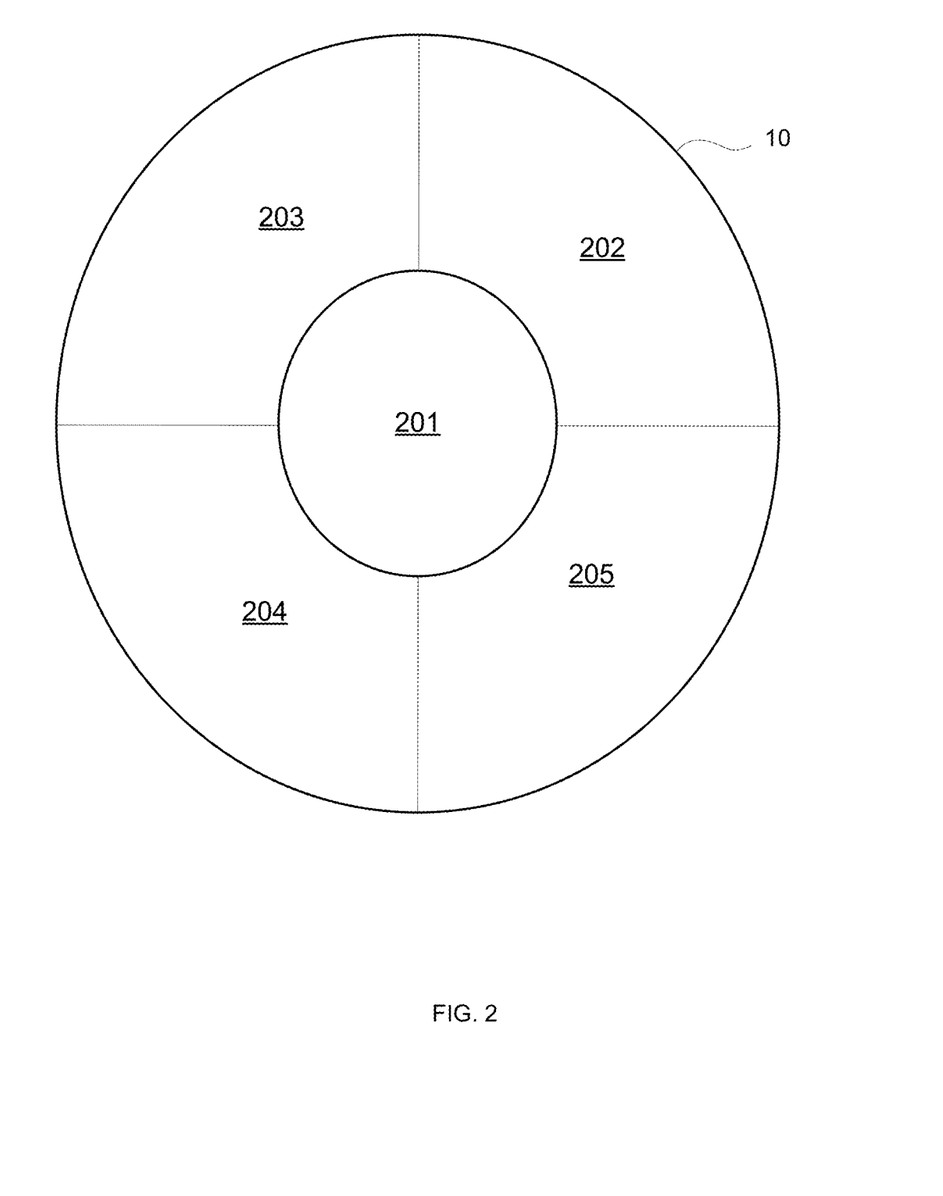
FIG. 2 illustrates an example of a partition of the wafer to five regions.

FIG. 2 illustrates a partition of the wafer 10 to five regions—first region 201, second region 202, third region 203, fourth region 204 and fifth region 205. The first region 201 is a circle located at the center of the wafer 10. The other regions are segments of an annular part of the wafer that surrounds the first region.

The regions may differ by shape and size from the regions of FIG. 2.

Referring back to FIG. 1—the review may include searching for the multiple suspected defects at initial search windows. The initials search windows may be defined to include suspected defects. The initial search windows may be defined based on the OWIS determined locations of suspected defects of the group. An initial search window may be a part of a region of the wafer.

Step 120 may be followed by step 130 of filtering the multiple suspected defects to select, based on one or more selection criteria, suspected defects that form a group of suspected defects.

The filtering may include rejecting suspected defects that are outside a certain size range, rejecting suspected defects that reach the border to an initial search window and may extend outside the initial search window.

Yet for another example—filtering suspected defects based on a ratio between the highest and second highest automatic defect detection (ADR) scores.

The suspected defects of the group are only a part of the suspected defects of the substrate.

The size of the group (number of suspected defects per group) may be determined in various manners. For example—the size may be fixed, based on success or failure of previous attempts to find suspected defects, and the like.

At the end of step 130, the group of suspected defects and the CPRS determined locations of a group of suspected defects are known. Table 1 illustrates an example of the outcome of step 130.

TABLE 1

| OWIS determined X-coordinate | OWIS determined Y-coordinate | CPRS determined X-coordinate | CPRS determined Y-coordinate |
| --- | --- | --- | --- |
| Xo1 | Yo1 | Xc1 | Yc1 |
| Xo2 | Yo2 | Xc2 | Yc2 |
| XoNg | YoNg | XcNg | YcNg |

It is assumed that the group of suspected defects includes a first number (Ng) of suspected defects. Ng is a positive integer that exceeds 1.

Method 100 may include searching, within one region of the wafer, for a predefined number of suspected defects that pass the filtering, and then searching for the next suspected defects that pass the filtering within another region of the wafer.

Step 130 may be followed by step 140 of defining multiple permutations of suspected defects. Each permutation of suspected defects is formed by a subgroup of the group of suspected defects.

Each subgroup includes a second number (Ns) of suspected defects. Ns is smaller than Ng.

Step 140 may include defining all the possible permutations of suspected defects. For example—all possible permutations of size Ns, given a group of size Ng.

Step 140 may be followed by step 150 of calculating a permutation related mapping, for each permutation of suspected defects (out of the multiple permutations of suspected defects).

The outcome of step 150 is multiple permutation related mappings.

Each permutation related mapping maps (a) CPRS determined locations of the suspected defects of the permutation, to (b) OWIS determined locations of the suspected defects of the permutation; wherein each permutation of suspected defects is formed by subgroup of the group of suspected defects.

The calculation may be made in various manners—for example by linear estimation.

All permutation mappings may consider one or more sources of location errors—such as X-Y offset, scaling and rotation.

Figure 3:
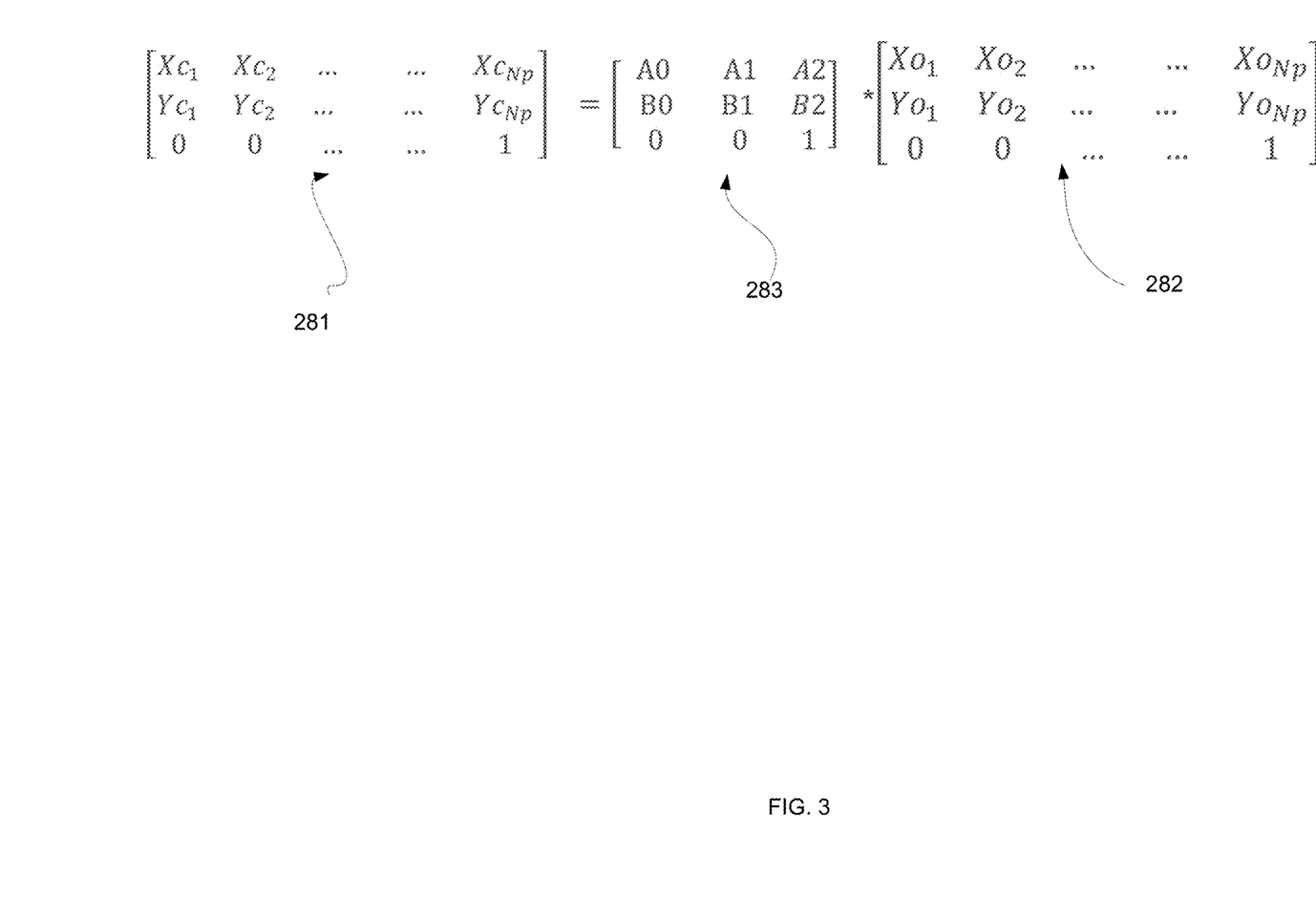
FIG. 3 illustrates an example of a linear estimator that is selected by calculating the least square error.

FIG. 3 illustrates an example of a linear estimator that is selected by calculating the least square error.

A premutation related mapping matrix 283 multiplied by OWIS coordinate matrix 282 equals a CPRS coordinate matrix 281.

In FIG. 3 the premutation related mapping matrix 283 includes three pairs of coefficients (A0, B0, A1, B1, A2, B2) that represent three different sources of location error—for example X-Y offset, scaling, and rotation.

A simpler premutation related mapping—for example a premutation related mapping that represents only X-Y offset will include a vector that includes only pair of coefficients (for example be a vector that include elements A0, B0 and zero.

Referring back to FIG. 1—step 150 may be followed by step 160 of selecting a selected permutation related mapping.

Step 160 may include steps 162 and 168.

Step 162 may include calculating a score for each of the multiple permutation related mappings to provide multiple scores.

Step 168 may include selecting the selected permutation based on the multiple scores.

Step 162 may include steps 164 and 166.

Step 164 may include applying each of the multiple permutation related mappings on OWIS determined locations of the group of suspected defects to provide estimated multiple CPRS determined locations of the group of suspected defects.

Step 166 may include calculating of the score for each of the multiple permutation related mappings is based on the multiple CPRS determined locations of the group of suspected defects.

The score may reflect the distribution of multiple CPRS determined locations of the group—more compact distributions may receive a higher score.

Figure 4:
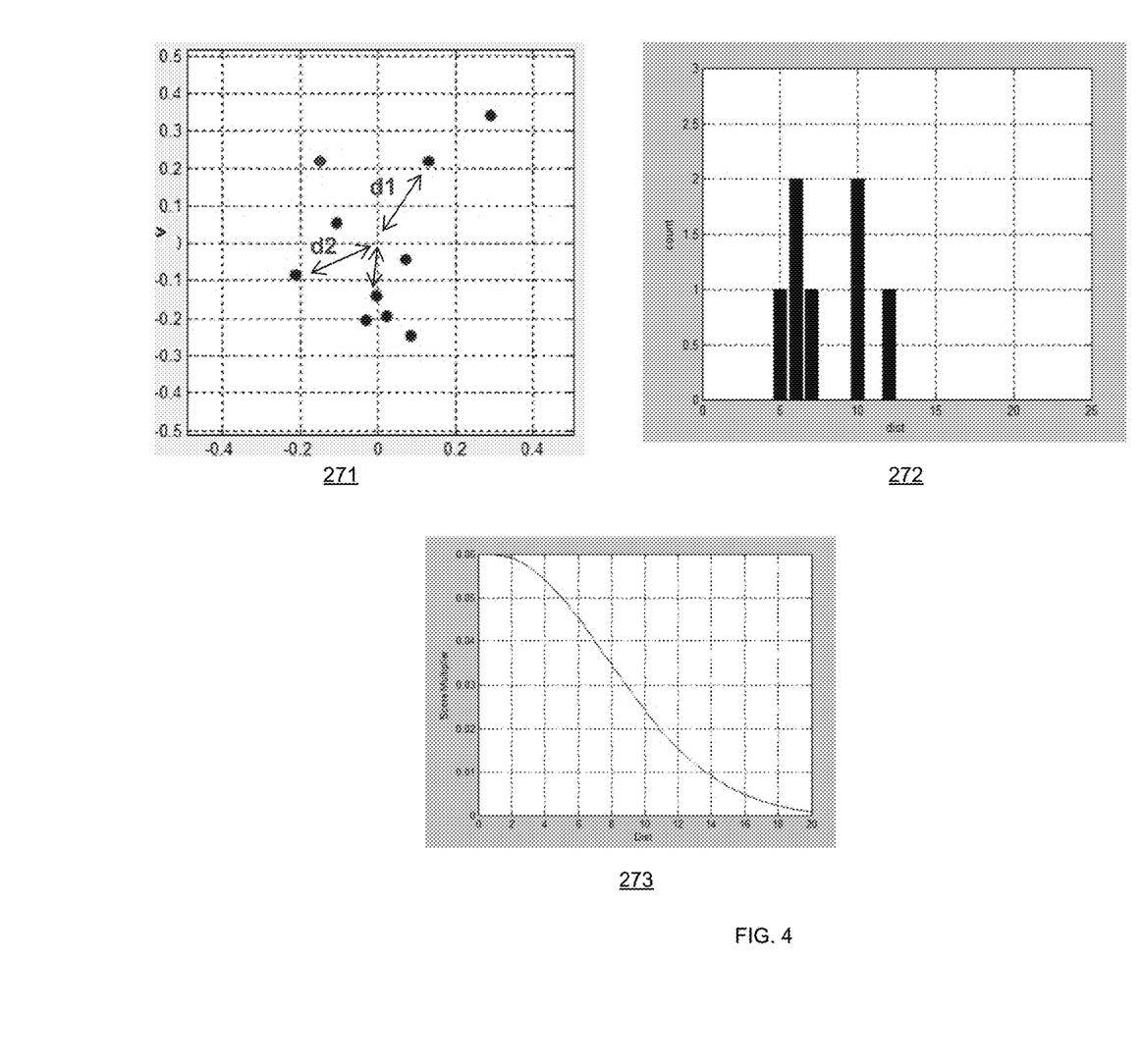
FIG. 4 illustrates an example of a distribution of estimated multiple CPRS determined locations, a histogram and a matched filter function.

FIG. 4 illustrates an example of (a) a distribution 271 of estimated multiple CPRS determined locations of the group of suspected defects, (b) a histogram 272 of distances of the multiple CPRS determined locations from a center of the distribution, and (c) a matched filter function 273 that is applied on the distances from the center to provide a score that is a weighted sum of the distances from the center.

Referring back to FIG. 1—step 168 may include selecting the permutation with the highest score—for example the highest weighted sum.

Step 160 may be followed by step 170 of determining whether to use the selected permutation related mapping for converting the OWIS determined locations of the suspected defects of the substrate to CPRS determined locations of the suspected defects of the substrate.

The determination can be made in various manners—for example by determining whether the selected permutation related mapping exhibits a high enough certainty level (CL).

Step 170 may include step 172 of calculating a chance for a uniformly distributed random sample occurring after applying the selected permutation related mapping within a predefined field of view (FOV) of the CPRS having a predefined width d. The predefined width (d) is smaller than the predefined width (L) of an initial FOV of the CPRS—a FOV of the CPRS used before applying method 100.

The value of the chance (n) is given as an input to method 100. A value of a probability (P) of having the suspected defects within the predefined FOV is also given as an input to method 100, and equals $(d/L)^2$.

Step 172 may include determining CL by calculating the following equation:

$$CL = 1 - \binom{n}{k} P^k (1-P)^{n-k}$$

When determining (in step 170) to use the selected permutation related mapping—then step 170 may be followed by step 180 of converting the OWIS determined locations of the suspected defects of the substrate to CPRS determined locations of the suspected defects of the substrate, by using the selected permutation related mapping.

Step 180 may be followed by step 190 of reviewing the suspected defects based on the CPRS determined locations of the suspected defects of the substrate.

This may include defining review search windows that include the CPRS determined locations of the suspected defects of the substrate and reviewing the suspected defects located in the review search window.

When determining (in step 170) not to use the selected permutation related mapping—then step 170 may be followed by step 174 of increasing a number of suspected defects within the group—increasing the number of suspected defects to be included in the multiple suspected defects.

The increasing of the number of suspected defects lengthens the execution period of method 100 but may increase the certainty level associated with the execution of method 100—by evaluating more suspected defects.

Step 174 may be followed by step 130.

Multiple iterations of steps 130, 140, 150, 160, 170 and 174 may be executed. The iteration may stop when a certain certainty level is obtained, and additionally or alternatively—after reaching a predefined number of iterations.

Method 100 (especially step 150) illustrates calculating a single permutation related mapping per permutation.

It should be noted that step 150 may include calculating different permutation related mappings per permutation.

The different permutation related mapping may include the previously mentioned permutation related mapping and one or more additional permutation related mappings.

The different permutation related mappings per permutation may differ from each other by computational complexity. For example—there may be one or more sources of location errors—such as X-Y offset, scaling and rotation. Different permutations may consider different number of sources of location errors. A simple permutation related mapping may consider only one source or location error—for example X-Y offset. A more complex permutation related mapping may consider two or more sources of location error—for example X-Y offset, scaling and rotation.

The selection of which type (or types) of permutation related mapping to use may be set in advance, may be changed over time, may be may change between one iteration (of steps 130, 140, 150, 160, 170 and 174) to another, may be based on a comparison between the score associated with permutation related mapping of different types, and the like.

For example, the simple permutation related mapping may be used during one or more first iterations of steps 130, 140, 150, 160, 170 and 174. Assuming that there is a need to perform yet one or more additional iterations—then the certainty level obtained during one of the first iterations may indicate that a more complex permutation related mapping should be evaluated. If the certainty level is not high enough—it may indicate that the simple permutation related mapping is not accurate enough—and a more complex permutation related mapping may be used.

Even when deciding to use a more complex permutation related mapping—the method may also apply the simple permutation related mapping—and then compare between the scores of the simple permutation related mapping and the more complex permutation related mapping—to determine which permutation related mapping to use in the current or next iteration.

The selection of the type of permutation related mapping may also be based on the resources available to execute method 100 and/or on time allocated for the completion of method 100. More resources and/or more available time may merit using the more complex permutation related mappings.

When more than a single type of permutation related mapping is selected then method 100 may include at least one out of:

- Calculating, for each permutation of suspected defects out of the multiple permutations of suspected defects, an additional permutation related mapping to provide multiple additional permutation related mappings. For at least one permutation of the multiple permutations, an additional permutation related mapping of the permutation differs by complexity from the permutation related mapping of the permutation. For at least one permutation of the multiple permutations, an additional permutation related mapping of the permutation differs by a number of sources of location errors from the permutation related mapping of the permutation. For example—a premutation related mapping may take into account only X-Y offset, while the additional premutation related mapping may take into account X-Y offset and at least one out of scaling and rotation.
- Calculating a score for each of the additional multiple permutation related mappings to provide additional multiple scores.
- Selecting the selected permutation based on the multiple scores (of the multiple permutation related mappings) and on the additional multiple scores.

Figure 5:
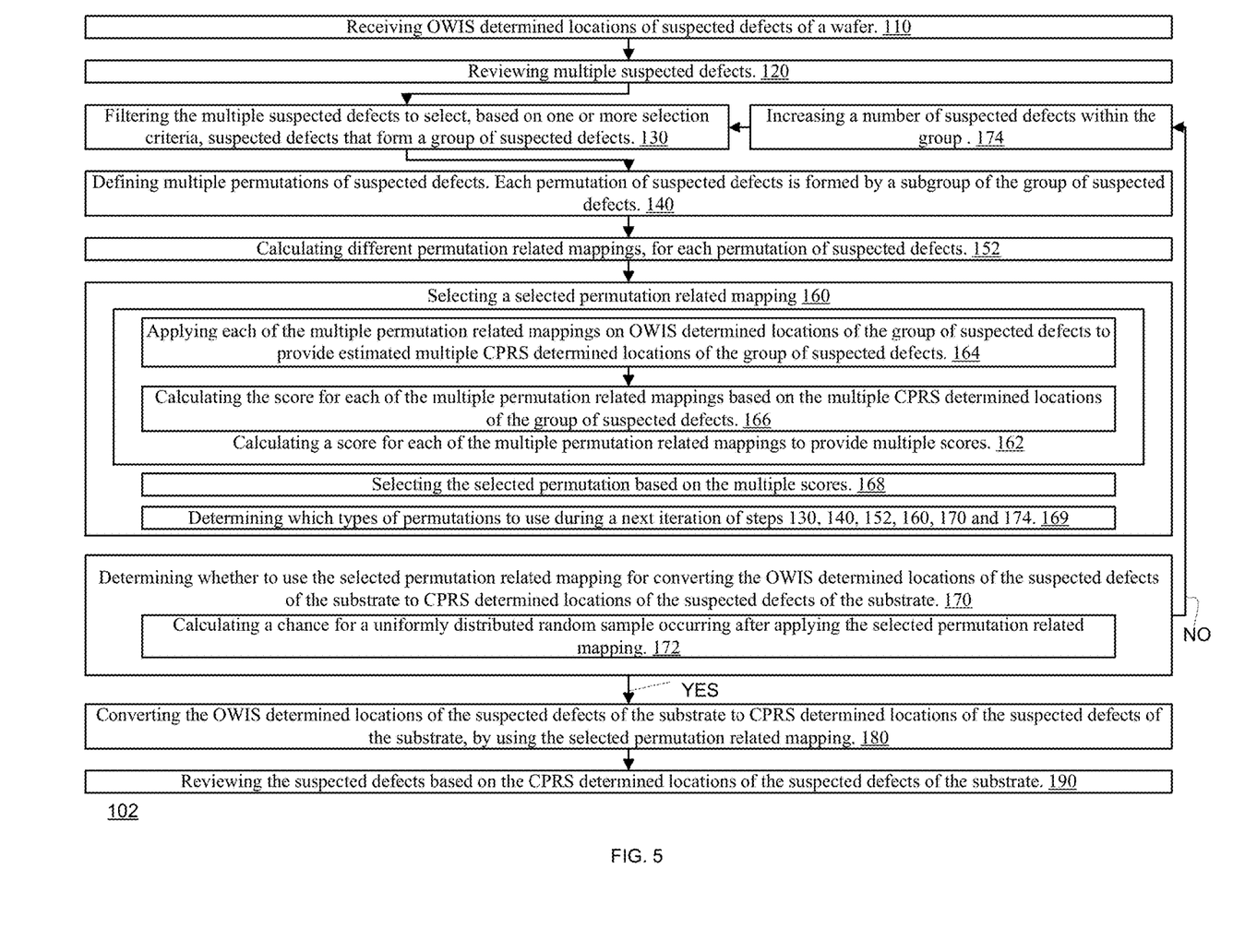
FIG. 5 illustrates an example of a method.

FIG. 5 illustrates method 102.

Method 102 may start by step 110 of receiving OWIS determined locations of suspected defects of a wafer. The OWIS determined locations of suspected defects of the wafer may be received by the CPRS.

Step 110 may be followed by step 120 of reviewing multiple suspected defects.

Step 120 may be followed by step 130 of filtering the multiple suspected defects to select, based on one or more selection criteria, suspected defects that form a group of suspected defects.

Step 130 may be followed by step 140 of defining multiple permutations of suspected defects. Each permutation of suspected defects is formed by a subgroup of the group of suspected defects.

Step 140 may be followed by step 152 of calculating different permutation related mappings, for each permutation of suspected defects (out of the multiple permutations of suspected defects).

The different permutation related mappings of a permutation may be regarded as a set of permutation related mappings.

The outcome of step 152 is multiple sets of permutation relation mappings.

Step 152 may be followed by step 160 of selecting a selected permutation related mapping.

The selection should be made out of multiple sets of permutation relation mappings. Accordingly—steps 162, 164, 166 and 168 may be applied to all permutation related mappings of the multiple sets of permutation relation mappings.

Step 160 may also include step 169 of determining which types of permutations to use during a next iteration of steps 130, 140, 152, 160, 170 and 174.

A type of permutation related mapping that provides a better tradeoff between CL and resource consumption can be made. Yet for another example—the simpler permutation related mapping may be selected as long as it provides at least a predefined CL.

Step 160 may be followed by step 170 of determining whether to use the selected permutation related mapping for converting the OWIS determined locations of the suspected defects of the substrate to CPRS determined locations of the suspected defects of the substrate.

The determination can be made in various manners—for example by determining whether the selected permutation related mapping exhibits a high enough certainty level (CL).

When determining (in step 170) to use the selected permutation related mapping—then step 170 may be followed by step 180 of converting the OWIS determined locations of the suspected defects of the substrate to CPRS determined locations of the suspected defects of the substrate, by using the selected permutation related mapping.

Step 180 may be followed by step 190 of reviewing the suspected defects based on the CPRS determined locations of the suspected defects of the substrate.

When determining (in step 170) not to use the selected permutation related mapping—then step 170 may be followed by step 174 of increasing a number of suspected defects within the group—increasing the number of suspected defects to be included in the multiple suspected defects.

The increasing of the number of suspected defects lengthens the execution period of method 100 but may increase the certainty level associated with the execution of method 100—by evaluating more suspected defects.

Step 174 may be followed by step 130.

Figure 6:
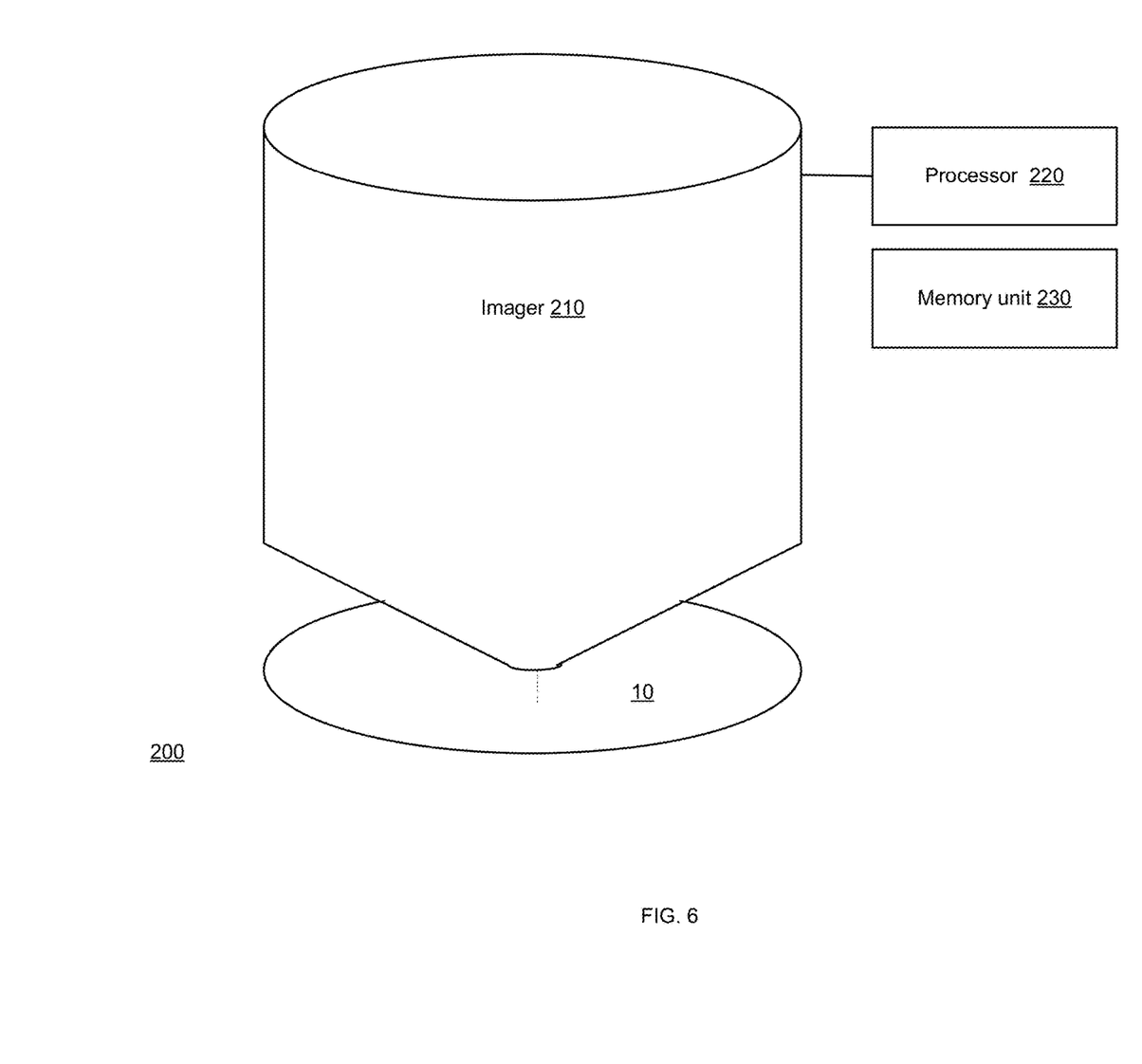
FIG. 6 illustrates an example of a system.

FIG. 6 is an example of a charged particle review system (CPRS) 200 and wafer 10.

CPRS 200 includes an imager 210, processor 220 and a memory unit 230.

Processor 200 may include one or more processing circuits such as microprocessors, preprocessors (such as image preprocessors), graphics processors, central processing units (CPUs), support circuits, digital signal processors, integrated circuits, memory, or any other types of devices suitable for running applications and for executing any of the mentioned above methods.

The imager 210 may be an electron beam imager, an electron beam microscope, an ion microscope, an ion imager, and the like. The electron beam microscope can be a scanning electron microscope, a transmission electron microscope, and the like.

System 200 may be configured to execute method 102 and, additionally or alternatively, may be configured to execute method 100.

For example—imager 210 may be configured to illuminate with a charge particle beam, suspected defects.

Processor 220 and/or memory unit 230 may be configured to perform other steps of method 100, and/or method 102.

For example—memory unit 230 may be configured to store optical wafer inspection system (OWIS) determined locations of a group of suspected defects.

For example—processor 220 may be configured to:

- Determine CPRS determined locations of a group of suspected defects; wherein the determining is based at least in part on the OWIS determined locations of the group of suspected defects; wherein the suspected defects of the group are only a part of the suspected defects of the substrate.
- For each permutation of suspected defects out of multiple permutations of suspected defects, calculate a permutation related mapping to provide multiple permutation relation mappings; wherein each permutation relation mapping maps CPRS determined locations of the suspected defects of the permutation, to OWIS determined locations of the suspected defects of the permutation; wherein each permutation of suspected defects is formed by subgroup of the group of suspected defects.

Select a selected permutation related mapping.

Determine whether to use the selected permutation related mapping for converting the OWIS determined locations of the suspected defects of the substrate to CPRS determined locations of the suspected defects of the substrate.

Convert the OWIS determined locations of the suspected defects of the substrate to CPRS determined locations of the suspected defects of the substrate, by using the selected permutation related mapping, when determining to use the selected permutation related mapping In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to be a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

We claim:

1. A method for determining locations of suspected defects of a substrate, the method comprises:

determining, by a charged particle review system (CPRS), CPRS determined locations of a group of suspected defects; wherein the determining is based at least in part on optical wafer inspection system (OWIS) determined locations of the group of suspected defects; wherein the suspected defects of the group are only a part of the suspected defects of the substrate;

for each permutation of suspected defects out of multiple permutations of suspected defects, calculating a permutation related mapping to provide multiple permutation relation mappings; wherein each permutation relation mapping maps CPRS determined locations of the suspected defects of the permutation, to OWIS determined locations of the suspected defects of the permutation; wherein each permutation of suspected defects is formed by subgroup of the group of suspected defects;

selecting a selected permutation related mapping;

determining whether to use the selected permutation related mapping for converting the OWIS determined locations of the suspected defects of the substrate to CPRS determined locations of the suspected defects of the substrate; and converting the OWIS determined locations of the suspected defects of the substrate to CPRS determined locations of the suspected defects of the substrate, by using the selected permutation related mapping, when determining to use the selected permutation related mapping.

2. The method according to claim 1 comprising increasing a number of suspected defects within the group and jumping to the determining of the CPRS location of the group, when determining not to use the selected permutation related mapping.

3. The method according to claim 1 comprising determining a certainty level of the selected permutation related mapping; and wherein the determining of whether to use the selected permutation related mapping is based on the certainty level of the selected permutation related mapping.

4. The method according to claim 1 comprising calculating a score for each of the multiple permutation related mappings to provide multiple scores; and selecting the selected permutation based on the multiple scores.

5. The method according to claim 4 comprising applying each of the multiple permutation related mappings on OWIS determined locations of the group of suspected defects to provide estimated multiple CPRS determined locations of the group of suspected defects; and wherein the calculating of the score for each of the multiple permutation related mappings is based on the multiple CPRS determined locations of the group of suspected defects.

6. The method according to claim 1 comprising calculating, for each permutation of suspected defects out of the multiple permutations of suspected defects, an additional permutation related mapping to provide multiple additional permutation related mappings.

7. The method according to claim 6 wherein for at least one permutation of the multiple permutations, an additional permutation related mapping of the permutation differs by complexity from the permutation related mapping of the permutation.

8. The method according to claim 6 wherein for at least one permutation of the multiple permutations, an additional permutation related mapping of the permutation differs by a number of sources of location errors from the permutation related mapping of the permutation.

9. The method according to claim 6 comprising calculating a score for each of the multiple permutation related mappings to provide multiple scores; calculating a score for each of the additional multiple permutation related mappings to provide additional multiple scores; and selecting the selected permutation based on the multiple scores and on the additional multiple scores.

10. The method according to claim 1 comprising reviewing multiple suspected defects; selecting, based on one or more selection criteria, suspected defects of the multiple to provide the group of suspected defects.

11. The method according to claim 10 comprising searching for the multiple suspected defects in different regions of the substrate.

12. A charged particle review system (CPRS), comprising:
a memory unit that is configured to store optical wafer inspection system (OWIS) determined locations of a group of suspected defects of a substrate;
a processor that is configured to:
  determine CPRS determined locations of a group of suspected defects; wherein the determining is based at least in part on the OWIS determined locations of the group of suspected defects; wherein the suspected defects of the group are only a part of the suspected defects of the substrate;
  for each permutation of suspected defects out of multiple permutations of suspected defects, calculate a permutation related mapping to provide multiple permutation relation mappings; wherein each permutation relation mapping maps CPRS determined locations of the suspected defects of the permutation, to OWIS determined locations of the suspected defects of the permutation; wherein each permutation of suspected defects is formed by subgroup of the group of suspected defects;
  select a selected permutation related mapping;
  determine whether to use the selected permutation related mapping for converting the OWIS determined locations of the suspected defects of the substrate to CPRS determined locations of the suspected defects of the substrate; and
  convert the OWIS determined locations of the suspected defects of the substrate to CPRS determined locations of the suspected defects of the substrate, by using the selected permutation related mapping, when determining to use the selected permutation related mapping.

13. A non-transitory computer readable medium that stores instructions for:
determining, by a charged particle review system (CPRS), CPRS determined locations of a group of suspected defects of a substrate; wherein the determining is based at least in part on optical wafer inspection system (OWIS) determined locations of the group of suspected defects; wherein the suspected defects of the group are only a part of suspected defects of the substrate;
for each permutation of suspected defects out of multiple permutations of suspected defects, calculating a permutation related mapping to provide multiple permutation relation mappings; wherein each permutation relation mapping maps CPRS determined locations of the suspected defects of the permutation, to OWIS determined locations of the suspected defects of the permutation; wherein each permutation of suspected defects is formed by subgroup of the group of suspected defects;
selecting a selected permutation related mapping;
determining whether to use the selected permutation related mapping for converting the OWIS determined locations of the suspected defects of the substrate to CPRS determined locations of the suspected defects of the substrate; and
converting the OWIS determined locations of the suspected defects of the substrate to CPRS determined locations of the suspected defects of the substrate, by using the selected permutation related mapping, when determining to use the selected permutation related mapping.

* * * * *